US011504702B2

(12) United States Patent
Yuan et al.

(10) Patent No.: US 11,504,702 B2
(45) Date of Patent: Nov. 22, 2022

(54) MODIFIED Y-TYPE MOLECULAR SIEVE, CATALYTIC CRACKING CATALYST COMPRISING THE SAME, ITS PREPARATION AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Shuai Yuan, Beijing (CN); Lingping Zhou, Beijing (CN); Huiping Tian, Beijing (CN); Hao Sha, Beijing (CN); Zhenyu Chen, Beijing (CN); Weilin Zhang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 58 days.

(21) Appl. No.: 17/256,943

(22) PCT Filed: Jun. 27, 2019

(86) PCT No.: PCT/CN2019/093279
§ 371 (c)(1),
(2) Date: Dec. 29, 2020

(87) PCT Pub. No.: WO2020/001540
PCT Pub. Date: Jan. 2, 2020

(65) Prior Publication Data
US 2021/0268486 A1   Sep. 2, 2021

(30) Foreign Application Priority Data

Jun. 29, 2018 (CN) .......................... 201810714296.1
Jun. 29, 2018 (CN) .......................... 201810715238.0

(51) Int. Cl.
| B01J 29/08 | (2006.01) |
| C10G 11/05 | (2006.01) |
| B01J 35/00 | (2006.01) |
| B01J 35/10 | (2006.01) |
| B01J 37/00 | (2006.01) |
| B01J 37/04 | (2006.01) |
| B01J 37/06 | (2006.01) |
| B01J 37/10 | (2006.01) |
| B01J 37/30 | (2006.01) |

(52) U.S. Cl.
CPC ........... B01J 29/088 (2013.01); B01J 35/002 (2013.01); B01J 35/0006 (2013.01); B01J 35/0033 (2013.01); B01J 35/1038 (2013.01); B01J 37/0009 (2013.01); B01J 37/04 (2013.01); B01J 37/06 (2013.01); B01J 37/10 (2013.01); B01J 37/30 (2013.01); C10G 11/05 (2013.01); B01J 2229/16 (2013.01); B01J 2229/186 (2013.01); B01J 2229/32 (2013.01); B01J 2229/36 (2013.01); B01J 2229/42 (2013.01); C10G 2300/202 (2013.01); C10G 2300/301 (2013.01); C10G 2300/302 (2013.01); C10G 2300/308 (2013.01); C10G 2300/70 (2013.01)

(58) Field of Classification Search
CPC .... B01J 29/084; B01J 35/002; B01J 35/1038; B01J 37/04; B01J 37/10; B01J 37/20; B01J 29/088; C10G 11/05
See application file for complete search history.

(56) References Cited

U.S. PATENT DOCUMENTS

| 4,273,753 | A | 6/1981 | Chang |
| 4,429,053 | A | 1/1984 | Ward |
| 4,438,178 | A | 3/1984 | Powers |
| 4,584,287 | A | 4/1986 | Ward |
| 4,750,988 | A | 6/1988 | Mitchell et al. |
| 5,206,194 | A | 4/1993 | Clark |
| 5,340,957 | A | 8/1994 | Clark |
| 5,925,235 | A | 7/1999 | Habib |
| 2015/0111722 | A1 | 4/2015 | Long et al. |

FOREIGN PATENT DOCUMENTS

| CA | 891483 A | 1/1972 |
| CN | 1194941 A | 10/1998 |

(Continued)

OTHER PUBLICATIONS

English machine translation of CN 102029177, obtained from GOOGLE patents (Year: 2011).*

(Continued)

Primary Examiner — Renee Robinson
(74) Attorney, Agent, or Firm — Novick, Kim & Lee, PLLC; Allen Xue

(57) ABSTRACT

A modified Y-type molecular sieve having a calcium content of about 0.3-4 wt % calculated on the basis of calcium oxide, a rare earth content of about 2-7 wt % calculated on the basis of rare earth oxide, and a sodium content of no more than about 0.5 wt % calculated on the basis of sodium oxide. The modified Y-type molecular sieve has a total pore volume of about 0.33-0.39 ml/g, a proportion of the pore volume of secondary pores having a pore size of 2-100 nm to the total pore volume of about 10-25%, a lattice constant of about 2.440-2.455 nm, a proportion of non-framework aluminum content to the total aluminum content of no more than about 20%, a lattice collapse temperature of not lower than about 1050° C., and a ratio of B acid to L acid in the total acid content of no less than about 2.30.

20 Claims, No Drawings

(56) References Cited

FOREIGN PATENT DOCUMENTS

| | | | |
|---|---|---|---|
| CN | 1382525 | A | 12/2002 |
| CN | 1382631 | A | 12/2002 |
| CN | 1388064 | A | 1/2003 |
| CN | 1566273 | A | 1/2005 |
| CN | 1683244 | A | 10/2005 |
| CN | 101618347 | A | 1/2010 |
| CN | 102020289 | A | 4/2011 |
| CN | 102029177 | A | 4/2011 |
| CN | 108452825 | A | 8/2018 |
| CN | 108452835 | A | 8/2018 |
| RU | 2621345 | C1 | 6/2017 |

OTHER PUBLICATIONS

English machine translation of CN 1194941, obtained from GOOGLE patents (Year: 1998).*
English machine translation of CN 1388064, obtained from GOOGLE patents (Year: 2003).*
English machine translation of CN 1683244, obtained from GOOGLE patents (Year: 2005).*

* cited by examiner

MODIFIED Y-TYPE MOLECULAR SIEVE, CATALYTIC CRACKING CATALYST COMPRISING THE SAME, ITS PREPARATION AND APPLICATION THEREOF

CROSS REFERENCE TO RELATED APPLICATIONS

The present application is a U.S. national phase entry of International Application No. PCT/CN2019/093279, filed on Jun. 27, 2019, which claims the priority of Chinese patent application No. 201810714296.1, titled "Modified Y-type molecular sieve with high stability for improving the production of branched C4-hydrocarbons, and preparation thereof", filed on Jun. 29, 2018; and the priority of Chinese patent application No. 201810715238.0, titled "Catalytic cracking catalyst", filed on Jun. 29, 2018, which are incorporated herein by reference in their entireties.

TECHNICAL FIELD

The present application relates to the technical field of molecular sieves and catalytic cracking, in particular to a modified Y-type molecular sieve, a catalytic cracking catalyst comprising the same, its preparation and application thereof.

BACKGROUND ART

At present, high-silica Y-type molecular sieves (also referred to as Y-type zeolites) are mainly produced via the hydrothermal method in industry. The hydrothermal method is the most commonly used method for preparing high-silica Y-type molecular sieves, in which a NaY molecular sieve is subjected to multiple times of rare earth ion exchange and high-temperature roasting, so as to obtain a rare earth-containing high-silica Y-type molecular sieve. However, rare earth-containing high-silica Y-type molecular sieves prepared via the hydrothermal method have the following defects: because the structure of the molecular sieve may be damaged under the severe conditions for hydrothermal treatment, Y-type molecular sieves with high silica-alumina ratio can hardly be obtained; although the generation of non-framework aluminum is beneficial to improving the stability of the molecular sieve and forming new acid centers, an excessive amount of non-framework aluminum may reduce the selectivity of the molecular sieve; in addition, many dealuminized voids in the molecular sieve may not be timely supplemented by silicon migrated from the framework, so that lattice defects may be generated in the molecular sieve, and the crystallinity retention of the molecular sieve is low. Besides, since conventional Y molecular sieves only comprise rare earth, silicon, aluminum and some other elements, the adjustment of their structure and performances is limited to a certain extent, so that the composition of a product is normally stabilized within a certain range. Consequently, rare earth-containing high-silica Y-type molecular sieves prepared by the hydrothermal method show poor thermal and hydrothermal stability, which is reflected by their low lattice collapse temperature, low crystallinity retention and specific surface area after hydrothermal aging, and poor selectivity.

In the method disclosed in U.S. Pat. Nos. 4,584,287 and 4,429,053, a NaY molecular sieve is first subjected to ion exchange with rare earth and then treated with steam, which makes the dealumination of the molecular sieve during the steam treatment difficult due to the shielding and supporting effect of the rare earth ion. The lattice parameter of the molecular sieve is increased to 2.465-2.475 nm before the steam treatment and is 2.420-2.464 nm after the treatment, and the temperature required for reducing the lattice parameter is relatively high (593-733° C.).

In the method disclosed in U.S. Pat. Nos. 5,340,957 and 5,206,194, a NaY molecular sieve having a $SiO_2/Al_2O_3$ ratio of 6.0 is used as a starting material, and the NaY is also subjected to rare earth ion exchange, and then to a hydrothermal treatment. Thus, the method also has the defect of the aforementioned U.S. Pat. Nos. 4,584,287 and 4,429,053.

Another method for preparing high-silica Y-type molecular sieves is the gas phase chemical method, which is another important method for preparing high-silica molecular sieves first reported by Beyer and Mankui in 1980. The gas phase chemical method generally involves the reaction of $SiCl_4$ and anhydrous NaY molecular sieve under the protection of nitrogen at a certain temperature. The whole reaction process fully utilizes the external Si source provided by $SiCl_4$, and the dealuminization and silicon supplementing reaction can be completed at one time through isomorphous substitution. U.S. Pat. Nos. 4,273,753 and 4,438,178, and Chinese patent application publication Nos. CN1382525A, CN1194941A, CN1683244A disclose a method for preparing ultra-stable Y-type molecular sieves by gas phase chemical dealumination with $SiCl_4$. However, molecular sieves treated simply by gas phase ultra-stabilization have substantially no secondary pores.

In addition, the production of branched C4-hydrocarbons and the content of branched hydrocarbons in the gasoline produced by using catalysts prepared from conventional Y molecular sieves is stabilized in a certain range and is difficult to be increased. Huayuan Zhu et al. (Acta Petrolei Sinica (Petroleum Processing Section), 2001, 17 (6): 6-10) has studied the influence of magnesium-containing modified molecular sieves on the performance of FCC catalysts, and reported that FCC catalysts based on Mg, Ca-containing molecular sieves show strong capability for heavy oil conversion, high activity for hydrogen transfer reaction and higher productivity of isobutane. However, the Y-type molecular sieve prepared by the method disclosed in this document has poor thermal and hydrothermal stability, and can only be used to increase the isobutane production under certain conditions, while cannot be effectively used to increase the content of branched hydrocarbons in gasoline.

The performance of ultra-stable molecular sieves prepared by the hydrothermal method or the gas phase method known in prior arts cannot satisfy current needs for processing heavy oils and inferior oils and improving the quality of gasoline.

The above description is provided merely as background of the present application, and is not admitted in any manner as prior art published before the filing date of the present application.

SUMMARY OF THE INVENTION

An object of the present application is to provide a highly stable modified Y-type molecular sieve, its preparation and application thereof, which is useful in catalytic cracking of heavy oils and can improve the production of branched C4-hydrocarbons and increase the content of branched hydrocarbons in gasoline. Another object of the present application is to provide a catalytic cracking catalyst comprising the modified Y-type molecular sieve, its preparation and application thereof, wherein the catalyst shows high thermal and hydrothermal stability, improved yield of gasoline, branched C4-hydrocarbons, and branched hydrocarbons in gasoline, and good coke selectivity.

To achieve the above objects, in an aspect, the present application provides a modified Y-type molecular sieve having a calcium content of about 0.3-4 wt % calculated on the basis of calcium oxide (CaO), a rare earth content of about 2-7 wt % calculated on the basis of rare earth oxide ($RE_2O_3$), and a sodium content of no more than about 0.5 wt % calculated on the basis of sodium oxide ($Na_2O$), on a dry basis and based on the weight of the modified Y-type molecular sieve, wherein the modified Y-type molecular sieve has a total pore volume of about 0.33-0.39 ml/g, a proportion of the pore volume of secondary pores having a pore size of 2-100 nm to the total pore volume of about 10-25%, a lattice constant of about 2.440-2.455 nm, a proportion of non-framework aluminum content to the total aluminum content of no more than about 20%, a lattice collapse temperature of not lower than about 1050° C., and a ratio of B acid to L acid in the total acid content of no less than about 2.30, as determined by pyridine adsorption infrared spectroscopy at 200° C.

In another aspect, the present application provides a method for preparing a modified Y-type molecular sieve, comprising the steps of:

(1) contacting a NaY molecular sieve with a solution of a soluble calcium salt and a soluble rare earth salt for ion exchange reaction, to obtain a Y-type molecular sieve comprising calcium and rare earth with reduced sodium content;

(2) subjecting the Y-type molecular sieve obtained in the step (1) to roasting at a temperature of about 350-480° C. in an atmosphere of about 30-90 vol % of steam for about 4.5-7 hours, and optionally drying, to obtain a Y-type molecular sieve with reduced lattice constant; and (3) contacting the Y-type molecular sieve obtained in the step (2) with gaseous silicon tetrachloride for reaction at a weight ratio of $SiCl_4$ to the Y-type molecular sieve with reduced lattice constant, on a dry basis, ranging from about 0.1:1 to about 0.7:1 and a reaction temperature of about 200-650° C. for a reaction time of about 10 minutes to about 5 hours, to obtain the modified Y-type molecular sieve.

In another aspect, the present application provides a modified Y-type molecular sieve obtained by the method for preparing the modified Y-type molecular sieve as described above.

In yet another aspect, the present application provides a catalytic cracking catalyst comprising about 10-50 wt %, on a dry basis, of the modified Y-type molecular sieve according to the present application, about 10-40 wt % of an alumina binder calculated on the basis of alumina, and about 10-80 wt %, on a dry basis, of a clay, based on the weight of the catalytic cracking catalyst.

In yet another aspect, the present application provides the use of a modified Y-type molecular sieve according to the present application in catalytic cracking of hydrocarbon oils, comprising a step of contacting a hydrocarbon oil with a catalytic cracking catalyst comprising the modified Y-type molecular sieve.

The modified Y-type molecular sieve according to the present application has high thermal and hydrothermal stability, and can be used as an active component in a catalytic cracking catalyst for conversion of heavy oils or inferior oils; be used for adsorption desulfurization of gasoline so as to improve the octane number of the desulfurized gasoline; and be used for isodewaxing of lubricating oils. When used in catalytic cracking of hydrocarbon oils, the modified Y-type molecular sieve shows a high heavy oil conversion capacity, and can provide a high yield of liquefied gas, branched C4-hydrocarbons and gasoline, an increased content of branched hydrocarbons in the resulted gasoline, a high light oil yield, a total liquid yield and a good coke selectivity. The modified Y-type molecular sieve can be used for increasing the yield of gasoline with higher content of branched hydrocarbons and increasing the yield of branched C4-hydrocarbons at the same time.

The catalytic cracking catalyst according to the present application comprising the molecular sieve as an active component has high hydrothermal stability, and, when used for catalytic cracking of heavy oils, shows higher heavy oil conversion activity and lower coke selectivity, and can provide a higher yield of gasoline, light oil, total liquid and branched C4-hydrocarbons, and a higher content of branched hydrocarbons in the resulted gasoline, as compared to existing catalytic cracking catalysts comprising Y-type molecular sieves.

DETAILED DESCRIPTION OF THE INVENTION

The present application will now be described in further detail with reference to embodiments thereof, and it should be noted that the embodiments described herein are merely provided for the purpose of illustrating and explaining the present application, while are not intended to be restrictive in any manner.

Any numerical value (including the end values of numerical ranges) provided herein is not limited to the precise value recited, but should be interpreted as covering any value close to said precise value, such as all possible values within 5% of said precise value. Moreover, for any numerical range provided herein, one or more new numerical ranges can be obtained by arbitrarily combining the end values of the range, an end value with a specific value provided within the range, or various specific values provided within the range. Such new numerical ranges should also be considered as being specifically disclosed herein.

Unless otherwise indicated, all terms used herein have the same meaning as commonly understood by those skilled in the art, and where the definition of a term provided herein is different from the ordinary understanding in the art, the definition provided herein shall prevail.

In the present application, except for those explicitly stated, any matter or matters not mentioned are directly applicable to those known in the art without any change. Moreover, any of the embodiments described herein can be freely combined with one or more of other embodiments described herein, and the resulted technical solution or technical idea should be considered as a part of the original disclosure or original description of the present application, while should not be considered as a new matter that has not been disclosed or anticipated herein, unless it is apparent to those skilled in the art that such a combination is obviously unreasonable.

The RIPP test methods involved in the present application can be found in "Petrochemical Analysis Methods (RIPP Test Methods)", edited by Cuiding YANG et al., Science Press, September 1990, First Edition, ISBN: 7-03-001894-X, pages 263-268, 412-415 and 424-426, which is incorporated herein by reference in its entirety.

All patent and non-patent literatures mentioned herein, including but not limited to textbooks and journal articles, are hereby incorporated by reference in their entireties.

As used herein, the term "branched hydrocarbon(s)" refers to isoparaffins and branched alkenes. The increase of the content of branched hydrocarbons is beneficial to improving the quality of the gasoline, for example, by retaining the octane number of the gasoline while the content of aromatic hydrocarbons and olefins being reduced.

As used herein, the term "branched C4-hydrocarbon(s)" refers to isoparaffins and branched alkenes having 4 carbon atoms, such as isobutane and isobutene.

As used herein, the expression "Y-type molecular sieve having a normal lattice constant" means that the lattice constant of the Y-type molecular sieve is within the range of the lattice constant of conventional NaY molecular sieves, which is preferably in a range of about 2.465 nm to about 2.472 nm.

As used herein, the term "atmospheric pressure" means a pressure of about 1 atm.

As used herein, the weight, on a dry basis, of a material refers to the weight of the solid product obtained after roasting the material at 800° C. for 1 hour.

In the present application, the terms "Y-type molecular sieve" and "Y-type zeolite" are used interchangeably, and the terms "NaY molecular sieve" and "NaY zeolite" are also used interchangeably.

In the present application, a solution of a soluble calcium salt is also referred to as a calcium salt solution, and a solution of a soluble rare earth salt is also referred to as a rare earth salt solution. The calcium salt may be any calcium salt soluble in a solvent such as water, preferably calcium chloride and/or calcium nitrate. The rare earth salt may be any rare earth salt soluble in a solvent such as water, preferably a rare earth chloride and/or a rare earth nitrate. The rare earth can be, for example, one or more of La, Ce, Pr, Nd and mixed rare earth. Preferably, the mixed rare earth comprises one or more of La, Ce, Pr and Nd, or may further comprise at least one rare earth other than La, Ce, Pr and Nd.

In a first aspect, the present application provides a modified Y-type molecular sieve having a calcium content of about 0.3-4 wt %, for example about 0.5-3.5 wt %, about 0.9-3 wt %, or about 0.9-4 wt %, calculated on the basis of calcium oxide; a rare earth content of about 2-7 wt %, preferably about 2.5-6.5 wt %, for example about 2.5-4.5 wt %, calculated on the basis of rare earth oxide; and a sodium content of no more than about 0.5 wt %, that may be about 0.1-0.5 wt %, for example about 0.13-0.4 wt %, preferably about 0.15-0.5 wt %, for example about 0.2-0.5 wt %, about 0.3-0.5 wt %, 0.20-0.45 wt %, or 0.25-0.4 wt %, calculated on the basis of sodium oxide.

In a preferred embodiment, the modified Y-type molecular sieve of the present application are substantially free of modifying ions or elements other than calcium and rare earth, including but not limited to P, Mg, Ga, Cr, Zn, Cu, and the like. For example, each modifying ion or element other than calcium and rare earth may be present in an amount (calculated on the basis of oxides) less than about 0.1 wt %, for example less than about 0.05 wt %, or less than about 0.01 wt %, relative to the weight on a dry basis of the modified Y-type molecular sieve.

In the modified Y-type molecular sieve of the present application, the proportion of the pore volume of secondary pores having a pore size (i.e. pore diameter) of 2-100 nm to the total pore volume is about 10-25%, preferably about 15-23%, for example about 15-21% or 17-21%.

In the modified Y-type molecular sieve of the present application, the proportion of non-framework aluminum content to the total aluminum content is not greater than about 20%, for example, from about 10% to about 20% or from about 13% to about 19%.

The modified Y-type molecular sieve of the present application is a high-silica Y-type molecular sieve having a framework silica-alumina ratio (calculated as $SiO_2/Al_2O_3$ molar ratio) of about 7.3-14.0, for example about 8-12.6.

The modified Y-type molecular sieve of the present application have a lattice collapse temperature (also referred to as structure collapse temperature) of not lower than about 1050° C. Preferably, the molecular sieve has a lattice collapse temperature of about 1050-1080° C., for example about 1050-1063° C. or about 1052-1065° C.

In the modified Y-type molecular sieve of the present application, the ratio of B acid to L acid in the total acid content is not less than about 2.30, preferably about 2.4-3.5, 2.4-4.2, or 2.3-5.0, as determined by pyridine adsorption infrared spectroscopy at 200° C.

The modified Y-type molecular sieve of the present application has a lattice constant of about 2.440-2.455 nm, for example about 2.442-2.452 nm.

In a preferred embodiment, the modified Y-type molecular sieve of the present application has a relative crystallinity of no less than about 58%, for example about 58-68%, about 59-63%, about 60-70%, or about 60-66%.

The modified Y-type molecular sieve of the present application has a crystalline retention of no less than about 35%, for example about 36-45%, about 38-44%, about 35-48%, or about 39-45%, after aging at 800° C. under atmospheric pressure in a 100 vol % steam atmosphere for 17 hours.

In a preferred embodiment, the modified Y-type molecular sieve of the present application has a specific surface area of about 620-670 $m^2/g$, for example, about 630-660 $m^2/g$.

The modified Y-type molecular sieve of the present application has a total pore volume of about 0.33-0.39 mL/g, preferably about 0.35-0.39 mL/g, for example about 0.35-0.375 mL/g.

In a preferred embodiment, the modified Y-type molecular sieve of the present application has a micropore volume of about 0.25-0.35 mL/g, for example about 0.26-0.32 mL/g or about 0.28-0.31 mL/g.

In a preferred embodiment, the modified Y-type molecular sieve of the present application is prepared by a method for preparing a modified Y-type molecular sieve as described herein below.

The modified Y-type molecular sieve of the present application has high thermal and hydrothermal stability, and high selectivity to branched hydrocarbons, and, when used for catalytic cracking of heavy oils, can provide a higher heavy oil conversion activity, a lower coke selectivity, a higher yield of gasoline, branched C4-hydrocarbons, light oil, and total liquid, and an increased content of branched hydrocarbons in the resulted gasoline, as compared to existing Y-type molecular sieves.

In a second aspect, the present application provides a method for preparing a modified Y-type molecular sieve, comprising the steps of:

(1) contacting a NaY molecular sieve with a solution of a soluble calcium salt and a soluble rare earth salt for ion exchange reaction, to obtain a Y-type molecular sieve comprising calcium and rare earth with reduced sodium content;

(2) subjecting the Y-type molecular sieve obtained in the step (1) to roasting at a temperature of about 350-480° C. in an atmosphere of about 30-90 vol % of steam for about 4.5-7 hours, and optionally drying, to obtain a Y-type molecular sieve with reduced lattice constant; and (3) contacting the Y-type molecular sieve obtained in the step (2) with gaseous silicon tetrachloride for reaction at a weight ratio of $SiCl_4$ to the Y-type molecular sieve with reduced lattice constant on a dry basis ranging from about 0.1:1 to about 0.7:1 and a reaction temperature of about 200-650° C. for a reaction time of about 10 minutes to about 5 hours, to obtain the modified Y-type molecular sieve.

In some particular embodiments, the method comprises the steps of:

(1) contacting the NaY molecular sieve with the solution of soluble calcium salt and soluble rare earth salt to conduct an ion exchange reaction, filtering and washing, to obtain a Y-type molecular sieve comprising calcium and rare earth and having a normal lattice constant and reduced sodium content;

(2) subjecting the Y-type molecular sieve comprising calcium and rare earth and having a normal lattice constant and reduced sodium content to a modification, optionally drying, to obtain a Y-type molecular sieve with reduced lattice constant, wherein the modification comprises roasting the Y-type molecular sieve comprising calcium and rare earth and having a normal lattice constant and reduced sodium content at about 350-480° C. in an atmosphere comprising about 30-90 vol % of steam (also referred to as an atmosphere of about 30-90 vol % of steam or about 30-90 vol % of steam) for about 4.5-7 hours; and (3) contacting the Y-type molecular sieve with reduced lattice constant with gaseous silicon tetrachloride for reaction at a weight ratio of $SiCl_4$ to the Y-type molecular sieve with reduced lattice constant obtained in step (2), on a dry basis, ranging from about 0.1:1 to about 0.7:1 and a reaction temperature of about 200-650° C. for a reaction time of about 10 minutes to about 5 hours, and then washing and filtering, to obtain the modified Y-type molecular sieve.

In some particular embodiments, the Y-type molecular sieve with reduced lattice constant used in step (3) has a water content of no more than about 1 wt. %. If the water content of the Y-type molecular sieve obtained after the modification in the step (2) (i.e. the Y-type molecular sieve obtained after the roasting) is not more than about 1 wt %, the Y-type molecular sieve can be directly used for contacting with silicon tetrachloride to carry out the reaction, and if the water content of the Y-type molecular sieve obtained after the roasting in the step (2) is more than 1 wt %, the Y-type molecular sieve with reduced lattice constant obtained after the roasting in the step (2) is further dried to arrive at a water content of less than about 1 wt %.

In the method for preparing a modified Y-type molecular sieve according to the present application, the contacting in step (1) may be carried out by contacting the NaY molecular sieve with a solution of a soluble calcium salt and a solution of a soluble rare earth salt sequentially (for example, contacting with a rare earth salt solution first and then with a calcium salt solution, or contacting with a calcium salt solution first and then with a rare earth salt solution) for ion exchange, or contacting the NaY molecular sieve with a solution comprising a soluble calcium salt and a soluble rare earth salt (also referred to as a mixed solution of a soluble calcium salt and a soluble rare earth salt herein). The mixed solution of the soluble calcium salt and the soluble rare earth salt can be obtained by mixing a soluble calcium salt and a soluble rare earth salt with a solvent such as water.

The NaY molecular sieve may be commercially available or prepared according to existing methods. In particular embodiments, the NaY molecular sieve has a lattice constant of about 2.465-2.472 nm, a framework silica-alumina ratio ($SiO_2/Al_2O_3$ molar ratio) of about 4.5-5.2, a relative crystallinity of about 85% or more, for example about 85-95%, and a sodium content of about 13.0-13.8 wt % calculated on the basis of sodium oxide.

In the ion exchange reaction of step (1), the exchange temperature is preferably about 15-95° C., for example about 65-95° C., the exchange time is preferably about 30-120 minutes, for example about 45-90 minutes, the weight ratio of the NaY molecular sieve (on a dry basis):the calcium salt (calculated on the basis of CaO):the rare earth salt (calculated on the basis of $RE_2O_3$):$H_2O$ is about 1:0.009-0.28:0.005-0.09:5-15. The rare earth salt is a soluble rare earth salt, and the calcium salt is a soluble calcium salt.

In a preferred embodiment, in the ion exchange reaction of step (1), the NaY molecular sieve, the calcium salt, the rare earth salt and water are mixed at a weight ratio of the NaY molecular sieve:the calcium salt:the rare earth salt:$H_2O$ of about 1:0.009-0.27:0.005-0.09:5-15, and the mixture is stirred at about 15-95° C., for example about 65-95° C., for preferably about 30-120 minutes, to conduct an ion exchange of calcium ion and rare earth ion with sodium ion. The water is for example decationized water, deionized water or a mixture thereof. The mixing of the NaY molecular sieve, the calcium salt, the rare earth salt and water can be carried out by forming a slurry of the NaY molecular sieve in water, and then adding thereinto a calcium salt and/or an aqueous calcium salt solution, a rare earth salt and/or an aqueous rare earth salt solution.

In a preferred embodiment of the method according to the present application, the washing in step (1) is intended to wash off exchanged sodium ions, for example, using deionized water or decationized water. Preferably, the Y-type molecular sieve comprising calcium and rare earth and having a normal lattice constant and reduced sodium content obtained in step (1) has a calcium content of about 0.3-10 wt %, for example about 0.9-9 wt %, about 0.4-6 wt %, about 1-5 wt %, about 2-4 wt %, about 0.3-4 wt %, about 3-6 wt %, about 3.5-5.5 wt %, or about 4-9 wt %, calculated on the basis of CaO; a rare earth content of about 2-8 wt %, about 2.1-7 wt %, about 3-7 wt %, or about 4-6 wt % calculated on the basis of $Re_2O_3$; a sodium content of no more than about 9 wt %, for example about 5.0-8.5 wt % or about 5.5-7.5 wt % calculated on the basis of sodium oxide, and a lattice constant of about 2.465-2.472 nm.

In a preferred embodiment of the method according to the present application, the roasting conditions of step (2) include: a roasting temperature of about 380-460° C., a roasting atmosphere of about 40-80 vol % steam, and a roasting time of about 5-6 hours.

In a preferred embodiment of the method according to the present application, the steam atmosphere contains about 30-90 vol %, preferably about 40-80 vol %, of steam, and may further contain other gases, such as one or more of air, helium, or nitrogen.

In a preferred embodiment of the method according to the present application, the Y-type molecular sieve with reduced lattice constant obtained in step (2) has a lattice constant of about 2.450-2.462 nm.

In a preferred embodiment of the method according to the present application, the step (2) further comprises drying the roasted molecular sieve, so as to obtain a Y-type molecular sieve with reduced lattice constant that has a water content of preferably no more than about 1 wt %.

In a preferred embodiment of the method according to the present application, in the step (3), the weight ratio of $SiCl_4$:the Y-type molecular sieve (on a dry basis) is about 0.3:1 to about 0.6:1, and the reaction temperature is about 350-500° C.

In a preferred embodiment of the method according to the present application, the step (3) may further comprise washing the resulted modified Y-type molecular sieve with water.

The washing may be carried out by a conventional washing method, using water such as deionized water or decationized water, for the purpose of removing soluble by-products such as $Na^+$, $Cl^-$, $Al^{3+}$ and the like remaining in the molecular sieve. For example, the washing conditions may include: a weight ratio of the washing water to the molecular sieve of about 5-20:1, for example about 6-15:1, a pH of about 2.5-5.0, and a washing temperature of about 30-60° C. Preferably, the washing is carried out to an extent that no free ions like $Na^+$, $Cl^-$ and $Al^{3+}$ can be detected in the spent washing liquid, and normally the content of each of the $Na^+$, $Cl^-$ and $Al^{3+}$ ions in the spent washing liquid is not more than about 0.05 wt %.

In a preferred embodiment of the method according to the present application, the method for preparing the modified Y-type molecular sieve according to the present application comprises the steps of:

(1) contacting a NaY molecular sieve (also referred to as NaY zeolite) with a mixed solution of a soluble calcium salt and rare earth salt for ion exchange reaction, filtering and washing, to obtain a Y-type molecular sieve comprising calcium and rare earth and having a normal lattice constant and reduced sodium content, said ion exchange being carried out under stirring at a temperature of about 15-95° C., preferably about 65-95° C., for about 30-120 minutes;

(2) subjecting the Y-type molecular sieve comprising calcium and rare earth and having a normal lattice constant and reduced sodium content to roasting at a temperature of about 350-480° C. in an atmosphere containing about 30-90 vol % of steam for about 4.5-7 hours and drying, to obtain a Y-type molecular sieve having a reduced lattice constant and a water content of less than about 1 wt %, wherein the lattice constant of the Y-type molecular sieve having a reduced lattice constant is about 2.450-2.462 nm; and (3) contacting the Y-type molecular sieve having a reduced lattice constant and a water content of less than about 1 wt % with a gaseous $SiCl_4$ vaporized by heating for reaction at a weight ratio of $SiCl_4$ to the Y-type molecular sieve having a reduced lattice constant (on a dry basis) of about 0.1:1 to about 0.7:1 and a temperature of about 200-650° C. for about 10 minutes to about 5 hours, washing and filtering, to obtain the modified Y-type molecular sieve.

The method for preparing a modified Y-type molecular sieve comprising calcium and rare earth according to the present application can be used to produce high-silica Y-type molecular sieves with high crystallinity, high thermal stability, high hydrothermal stability and certain secondary pore structure. The calcium- and rare earth-containing molecular sieve obtained has a uniform distribution of aluminum and low non-framework aluminum content. When used for catalytic cracking of heavy oils, the modified Y-type molecular sieve shows good coke selectivity, and high cracking activity for heavy oils, and can provide an improvement in the yield of gasoline, branched C4-hydrocarbons, liquefied gas, light oil and total liquid, as well as increase in the branched hydrocarbons content in gasoline.

In a third aspect, the present application provides a modified Y-type molecular sieve prepared by the method for preparing the modified Y-type molecular sieve according to the present application.

In a fourth aspect, the present application provides a catalytic cracking catalyst comprising about 10-50 wt %, on a dry basis, of the modified Y-type molecular sieve according to the present application, about 10-40 wt % of an alumina binder calculated on the basis of alumina, and about 10-80 wt %, on a dry basis, of a clay, based on the weight of the catalytic cracking catalyst.

In some embodiments, the catalytic cracking catalyst according to the present application may further comprise an additional molecular sieve other than the modified Y-type molecular sieve, and the additional molecular sieve may be present in an amount, on a dry basis, of about 0-40 wt %, for example about 0-30 wt % or about 1-20 wt %, based on the weight of the catalyst. The additional molecule sieve can be selected from various molecular sieves useful in catalytic cracking catalysts, such as one or more of zeolites having MFI structure, Beta zeolite, other Y zeolites, and non-zeolitic molecular sieves. Preferably, the additional Y-type molecular sieve is present in an amount, on a dry basis, of no more than about 40 wt %, for example about 1-40 wt % or about 0-20 wt %. The additional Y-type molecular sieve may be, for example, one or more of REY, REHY, DASY, SOY, and PSRY; the zeolite having MFI structure may be, for example, one or more of HZSM-5, ZRP, and ZSP; the beta zeolite may be, for example, HP zeolite; and the non-zeolitic molecular sieve may be, for example, one or more of aluminum phosphate molecular sieves (AlPO molecular sieves) and silicoaluminophosphate molecular sieves (SAPO molecular sieves).

In a preferred embodiment of the catalyst according to the present application, the modified Y-type molecular sieve is present in an amount, on a dry basis, of about 15-45 wt %, for example about 25-40 wt %.

In the catalytic cracking catalyst of the present application, the clay may be selected from various clays suitable for use as a component in catalytic cracking catalysts, which are well known to those skilled in the art, such as one or more of kaolin, hydrated halloysite, montmorillonite, diatomite, halloysite, saponite, rector, sepiolite, attapulgite, hydrotalcite, and bentonite. Preferably, the clay is present in the catalytic cracking catalyst of the present application in an amount, on a dry basis, of about 20-55 wt % or about 30-50 wt %.

In a preferred embodiment, the catalytic cracking catalyst comprises 25-40 wt %, on a dry basis, of the modified Y-type molecular sieve, 20-35 wt % of the alumina binder calculated on the basis of alumina, and 30-50 wt %, on a dry basis, of the clay.

In the catalytic cracking catalyst according to the present application, the alumina binder is preferably present in an amount of about 20-35 wt %. According to the present application, the alumina binder may be one or more selected from the group consisting of various forms of alumina, hydrated alumina, and aluminum sol commonly used in catalytic cracking catalysts. For example, it may be one or more selected from the group consisting of γ-alumina, η-alumina, θ-alumina, χ-alumina, pseudoboemite, boehmite, gibbsite, bayerite and aluminum sol, preferably pseudoboehmite and aluminum sol. For example, the catalytic cracking catalyst may comprise about 2-15 wt %, preferably about 3-10 wt %, of an aluminium sol calculated on the basis of alumina, and about 10-30 wt %, preferably about 15-25 wt %, of pseudoboehmite calculated on the basis of alumina.

The catalytic cracking catalyst of the present application may be prepared using conventional methods, for example, may be prepared in accordance with existing methods, such as those described in Chinese Patent Application Publication CN1098130A, CN 1362472A. The preparation process generally comprises the steps of forming a slurry comprising the modified Y-type molecular sieve, a binder, clay and water, spray drying, and optionally washing and drying, in which the steps of spray drying, washing and drying are all known in prior arts, and there is no special requirement in the present application.

In a fifth aspect, the present application provides a method for preparing a catalytic cracking catalyst, comprising the steps of: providing a modified Y-type molecular sieve according to the present application, forming a slurry comprising the modified Y-type molecular sieve, an alumina binder, clay, and water, and spray drying.

In a sixth aspect, the present application provides the use of a modified Y-type molecular sieve according to the present application in catalytic cracking of hydrocarbon oils, comprising contacting a hydrocarbon oil with a catalytic cracking catalyst comprising the modified Y-type molecular sieve of the present application.

In a seventh aspect, the present application provides a catalytic cracking process comprising the step of contacting a heavy oil feedstock with a catalytic cracking catalyst of the present application for reaction under conditions for fluidized catalytic cracking of heavy oils.

In the catalytic cracking process of the present application, the heavy oil can be any heavy hydrocarbon oil feedstock known in the art, such as one or more of vacuum gas oil, atmospheric residue, vacuum residue, and heavy deasphalted oil.

In the catalytic cracking process of the present application, the reaction conditions for fluidized catalytic cracking of heavy oils may be those commonly used in the art, for example, may include: a reaction temperature of about 480-530° C., a reaction time of about 1-10 seconds, and a catalyst-to-oil ratio by weight of about 3:1 to about 20:1.

In some preferred embodiments, the present application provides the following technical solutions:

A1. A modified Y-type molecular sieve, having a calcium content of about 0.3-4 wt % calculated on the basis of calcium oxide (CaO), a rare earth content of about 2-7 wt % calculated on the basis of rare earth oxide ($RE_2O_3$), and a sodium content of no more than about 0.5 wt % calculated on the basis of sodium oxide ($Na_2O$), on a dry basis and based on the weight of said modified Y-type molecular sieve; a total pore volume of about 0.33-0.39 ml/g, a proportion of the pore volume of secondary pores having a pore size of 2-100 nm to the total pore volume of about 10-25%, a lattice constant of about 2.440-2.455 nm, a proportion of non-framework aluminum content to the total aluminum content of no more than about 20%, a lattice collapse temperature of not lower than about 1050° C., and a ratio of B acid to L acid in the total acid content of no less than about 2.30, as determined by pyridine adsorption infrared spectroscopy at 200° C.

A2. The modified Y-type molecular sieve according to Item A1, having a proportion of the pore volume of secondary pores having a pore size of 2-100 nm to the total pore volume of about 15-21%, preferably about 17-21%.

A3. The modified Y molecular sieve according to Item A1 or A2, having a proportion of non-framework aluminum content to the total aluminum content of about 13-19%, and a framework silica-alumina ratio of about 7.3-14 calculated as $SiO_2/Al_2O_3$ molar ratio.

A4. The modified Y-type molecular sieve according to any one of the preceding Items, having a lattice collapse temperature of about 1050-1080° C. or about 1050-1063° C.

A5. The modified Y-type molecular sieve according to any one of the preceding Items, having a ratio of B acid to L acid in the total acid content of about 2.3-5.0, about 2.4-4.2, or about 2.4-3.5, as determined by pyridine adsorption infrared spectroscopy at 200° C.

A6. The modified Y-type molecular sieve according to any one of the preceding Items, wherein the modified Y-type molecular sieve has a relative crystalline retention of about 35% or more, for example about 36-45% or about 35-48%, after aging at 800° C. under atmospheric pressure in a 100% steam atmosphere for 17 hours.

A7. The modified Y-type molecular sieve according to any one of the preceding Items, having a relative crystallinity of about 58-68%.

A8. The modified Y-type molecular sieve according to any one of the preceding Items, wherein the modified Y-type molecular sieve has a calcium content of about 0.5-3.5 wt % calculated on the basis of calcium oxide (CaO), a rare earth content of about 2.5-6.5 wt % calculated on the basis of rare earth oxide ($RE_2O_3$), a sodium content of about 0.2-0.5 wt % calculated on the basis of sodium oxide ($Na_2O$), a lattice constant of about 2.442-2.452 nm, and a framework silica-alumina ratio, calculated as $SiO_2/Al_2O_3$ molar ratio, of about 8-12.6.

A9. The modified Y-type molecular sieve according to any one of the preceding Items, wherein the modified Y-type molecular sieve has an O1s electron binding energy of no greater than about 532.70 eV, for example about 532.55-532.65 eV.

A10. A method for preparing a modified Y-type molecular sieve, comprising the steps of:

(1) contacting a NaY molecular sieve with a solution of a soluble calcium salt and a soluble rare earth salt for ion exchange reaction, to obtain a Y-type molecular sieve comprising calcium and rare earth with reduced sodium content;

(2) subjecting the Y-type molecular sieve obtained in the step (1) to roasting at a temperature of about 350-480° C. in an atmosphere of about 30-90 vol % of steam for about 4.5-7 hours, and optionally drying, to obtain a Y-type molecular sieve with reduced lattice constant; and (3) contacting the Y-type molecular sieve obtained in the step (2) with gaseous silicon tetrachloride for reaction at a weight ratio of $SiCl_4$ to the Y-type molecular sieve with reduced lattice constant, on a dry basis, of about 0.1:1 to about 0.7:1, and a reaction temperature of about 200-650° C. for a reaction time of about 10 minutes to about 5 hours, to obtain the modified Y-type molecular sieve.

A11. The method according to Item A10, wherein the Y-type molecular sieve obtained in step (1) has a lattice constant of about 2.465-2.472 nm and a sodium content of no more than about 8.8 wt % calculated on the basis of sodium oxide.

A12. The method according to Items A10 or A11, wherein the Y-type molecular sieve obtained in step (1) has a calcium content of about 0.3-10 wt %, for example about 0.9-9 wt %, calculated on the basis of calcium oxide (CaO), a rare earth content of about 2-8 wt %, for example about 2.1-7 wt %, calculated on the basis of rare earth oxide ($RE_2O_3$), a sodium content of about 4-8.8 wt %, for example about 5.0-8.5 wt %, calculated on the basis of sodium oxide ($Na_2O$), and a lattice constant of about 2.465-2.472 nm.

A13. The method according to any one of Items A10-A12, wherein in step (1), the NaY molecular sieve, the soluble calcium salt, the soluble rare earth salt and water are mixed at a weight ratio of the NaY molecular sieve:the soluble calcium salt:the soluble rare earth salt:$H_2O$ of about 1:0.009-0.28:0.005-0.09:5-15 for ion exchange.

A14. The method according to any one of Items A10-A13, wherein in step (1), the NaY molecular sieve is mixed with water, and a soluble calcium salt and/or a solution of a soluble calcium salt, and a soluble rare earth salt and/or a solution of a soluble rare earth salt are added under stirring to conduct an ion exchange reaction;

the conditions for the ion exchange reaction include: an exchange temperature of about 15-95° C. and an exchange time of about 30-120 minutes;

preferably, the solution of the soluble calcium salt and the solution of the soluble rare earth salt are an aqueous solution of the soluble calcium salt and an aqueous solution of the soluble rare earth salt, and/or preferably, the soluble calcium salt is calcium chloride and/or calcium nitrate, and the soluble rare earth salt is a rare earth chloride and/or a rare earth nitrate.

A15. The method according to any one of Items A10-A14, wherein in step (2), the roasting temperature is about 380-460° C., the roasting atmosphere is an atmosphere of about 40-80 vol % steam, and the roasting time is about 5-6 hours.

A16. The method according to any one of Items A10-A15, wherein the Y-type molecular sieve with reduced lattice constant obtained in step (2) has a lattice constant of about 2.450-2.462 nm and a water content of no more than about 1 wt %.

A17. The method according to any one of Items A10-A16, wherein the step (3) further comprises washing the resulted modified Y-type molecular sieve with water under washing conditions that include: molecular sieve:$H_2O$ ratio of about 1:5-20, a pH of about 2.5-5.0, and a washing temperature of about 30-60° C.

A18. A modified Y-type molecular sieve obtained by the method according to any one of Items A10-A17.

A19. A catalytic cracking catalyst comprising about 10-50 wt %, on a dry basis, of a modified Y-type molecular sieve, about 10-40 wt %, calculated on the basis of alumina, of an alumina binder and about 10-80 wt %, on a dry basis, of a clay; wherein the modified Y-type molecular sieve is a modified Y-type molecular sieve according to any one of Items A1-A9 and A18.

A20. Use of a modified Y-type molecular sieve according to any one of Items A1-A9 and A18 in the catalytic cracking of hydrocarbon oils, comprising a step of contacting a hydrocarbon oil with a catalytic cracking catalyst comprising the modified Y-type molecular sieve according to any one of Items A1-A9 and A18.

B1. A modified Y-type molecular sieve, having a calcium oxide content of about 0.3-4 wt %, a rare earth oxide content of about 2-7 wt %, a sodium oxide content of no more than about 0.5 wt %, a total pore volume of about 0.33-0.39 ml/g, a proportion of the pore volume of secondary pores having a pore size of 2-100 nm to the total pore volume of about 10-25%, a lattice constant of about 2.440-2.455 nm, a proportion of non-framework aluminum content to the total aluminum content of no more than about 20%, a lattice collapse temperature of not lower than about 1050° C., and a ratio of B acid to L acid in the total acid content of no less than about 2.30, as determined by pyridine adsorption infrared spectroscopy at 200° C.

B2. The modified Y-type molecular sieve according to Item B1, wherein the modified Y-type molecular sieve has a proportion of the pore volume of secondary pores having a pore size of 2-100 nm to the total pore volume of about 15-21%.

B3. The modified Y molecular sieve according to Item B1, wherein the modified Y molecular sieve has a proportion of non-framework aluminum content to the total aluminum content of about 13-19%, and a framework silica-alumina ratio of about 7.3-14 calculated as $SiO_2/Al_2O_3$ molar ratio.

B4. The modified Y-type molecular sieve according to Item B1, wherein the modified Y-type molecular sieve has a lattice collapse temperature of about 1050-1080° C. or 1050-1063° C.

B5. The modified Y molecular sieve according to Item B1, wherein the modified Y molecular sieve has a ratio of B acid to L acid in the total acid content of about 2.3-5.0, or 2.4-4.2, or 2.4-3.5, as determined by pyridine adsorption infrared spectroscopy at 200° C.

B6. The modified Y-type molecular sieve according to Item B1, wherein the modified Y-type molecular sieve has a relative crystallinity retention of about 35% or more, for example, about 36-45% or 35-48%, after aging at 800° C. under atmospheric pressure in a 100% steam atmosphere for 17 hours.

B7. The modified Y-type molecular sieve according to Item B1, wherein the modified Y-type molecular sieve has a relative crystallinity of about 58-68%.

B8. The modified Y-type molecular sieve according to any one of Items B1-B7, wherein the modified Y-type molecular sieve has a calcium oxide content of about 0.3-4 wt %, a rare earth oxide content of about 2-7 wt %, a sodium oxide content of about 0.2-0.5 wt %, a lattice constant of about 2.442-2.452 nm, and a framework silica-alumina ratio of about 8-12.6.

B9. A method for preparing a modified Y-type molecular sieve, comprising the steps of:

(1) contacting a NaY molecular sieve with a solution of a soluble calcium salt and a soluble rare earth salt for ion exchange reaction, filtering, washing, and optionally drying, to obtain a Y-type molecular sieve comprising calcium and rare earth and having a normal lattice constant and reduced sodium oxide content;

(2) subjecting the above Y-type molecular sieve comprising calcium and rare earth and having a normal lattice constant and reduced sodium oxide content to roasting at a temperature of about 350-480° C. in an atmosphere of about 30-90 vol % of steam for about 4.5-7 hours, optionally drying, to obtain a Y-type molecular sieve with reduced lattice constant; and (3) contacting the Y-type molecular sieve with reduced lattice constant with gaseous silicon tetrachloride for reaction at a weight ratio of $SiCl_4$ to the Y-type molecular sieve with reduced lattice constant, on a dry basis, of about 0.1:1 to about 0.7:1, and a reaction temperature of about 200-650° C. for a reaction time of about 10 minutes to about 5 hours, washing and filtering, to obtain the modified Y-type molecular sieve.

B10. The method according to Item B9, wherein the Y-type molecular sieve comprising calcium and rare earth and having a normal lattice constant and reduced sodium oxide content obtained in step (1) has a lattice constant of about 2.465-2.472 nm and a sodium oxide content of no more than about 8.8 wt %.

B11. The method according to Item B9, wherein in step (1), the Y-type molecular sieve comprising calcium and rare earth and having a normal lattice constant and reduced sodium oxide content has a calcium content of about 0.4-10 wt % calculated on the basis of CaO, a rare earth content of about 2-8 wt % calculated on the basis of $RE_2O_3$, a sodium oxide content of about 4-8.8 wt %, for example about 5.5-8.5 wt %, and a lattice constant of about 2.465-2.472 nm.

B12. The method according to Item B9, wherein the step (1) of contacting a NaY molecular sieve with a solution of a soluble calcium salt and a soluble rare earth salt for ion exchange reaction is carried out by mixing a NaY molecular sieve, a soluble calcium salt, a soluble rare earth salt, and water at a weight ratio of the NaY molecular sieve:the soluble calcium salt:the soluble rare earth salt:$H_2O$ of about 1:0.009-0.28:0.005-0.09:5-15, and stirring.

B13. The method according to Item B9 or B12, wherein the step (1) of contacting a NaY molecular sieve with a solution of a soluble calcium salts salt and a soluble rare earth salt for ion exchange reaction comprises: mixing a NaY molecular sieve with water, adding a soluble calcium salt and/or a soluble calcium salt solution and a soluble rare earth salt and/or a soluble rare earth salt solution under stirring for ion exchange reaction, filtering and washing; the conditions for the ion exchange reaction include: an exchange temperature of about 15-95° C., and an exchange time of about 30-120 minutes, wherein the solution of soluble calcium salt and the solution of soluble rare earth salt are aqueous solutions of the soluble calcium salt and the soluble rare earth salt; and the soluble calcium salt is for example calcium chloride and/or calcium nitrate, and the soluble rare earth salt is for example a rare earth chloride and/or a rare earth nitrate.

B14. The method according to Item B9, wherein in step (2), the roasting temperature is about 380-460° C., the roasting atmosphere is an atmosphere of about 40-80 vol % steam, and the roasting time is about 5-6 hours.

B15. The method according to Item B9, wherein the Y-type molecular sieve with reduced lattice constant obtained in step (2) has a lattice constant of about 2.450-2.462 nm, and a water content of no more than about 1 wt %.

B16. The method according to Item B9, wherein the washing of step (3) is carried out by washing with water under conditions including a ratio of molecular sieve:$H_2O$ of about 1: 6-15, a pH of about 2.5-5.0, and a washing temperature of about 30-60° C.

C1. A catalytic cracking catalyst comprising 10-50 wt %, on a dry basis, of a modified Y-type molecular sieve, 10-40 wt % of an alumina binder calculated on the basis of alumina, and 10-80 wt %, on a dry basis, of a clay; wherein the modified Y-type molecular sieve has a calcium oxide content of about 0.3-4 wt %, a rare earth oxide content of about 2-7 wt %, a sodium oxide content of no more than about 0.5 wt %, a total pore volume of about 0.33-0.39 ml/g, a proportion of the pore volume of secondary pores having a pore size of 2-100 nm to the total pore volume of about 10-25%, a lattice constant of about 2.440-2.455 nm, a proportion of non-framework aluminum content to the total aluminum content of no more than about 20%, a lattice collapse temperature of not lower than about 1050° C., and a ratio of B acid to L acid in the total acid content of no less than about 2.30, as determined by pyridine adsorption infrared spectroscopy at 200° C.

C2. The catalytic cracking catalyst according to Item C1, wherein the modified Y-type molecular sieve has a proportion of the pore volume of secondary pores having a pore size of 2-100 nm to the total pore volume of about 15-21%, a proportion of non-framework aluminum content to the total aluminum content of about 13-19%, a framework silica-alumina ratio of about 7.3-14 calculated as $SiO_2$/$Al_2O_3$ molar ratio, a lattice collapse temperature of about 1050-1080° C., for example about 1050-1063° C., and a ratio of B acid to L acid in the total acid content of about 2.4-4.2, as determined by pyridine adsorption infrared spectroscopy at 200° C.

C3. The catalytic cracking catalyst according to Item C1, wherein the modified Y-type molecular sieve has a relative crystallinity retention of about 35% or more, for example about 36-45%, after severe aging at 800° C. under atmospheric pressure in a 100% steam atmosphere for 17 hours.

C4. The catalytic cracking catalyst according to Item C1, wherein the modified Y-type molecular sieve has a relative crystallinity of about 58-68%.

C5. The catalytic cracking catalyst according to any one of Items C1-C4, wherein the modified Y-type molecular sieve has a calcium oxide content of about 0.3-4 wt %, a rare earth oxide content of about 2-7 wt %, a sodium oxide content of about 0.2-0.5 wt %, a lattice constant of about 2.442-2.452 nm, and a framework silica-alumina ratio of about 8-12.6.

C6. A method for preparing a catalytic cracking catalyst, comprising the steps of preparing a modified Y-type molecular sieve, forming a slurry comprising the modified Y-type molecular sieve, an alumina binder, a clay and water, and spray drying, wherein the modified Y-type molecular sieve is prepared by a method comprising the steps of:

(1) contacting a NaY molecular sieve with a solution of a soluble calcium salt and a soluble rare earth salt for ion exchange reaction, filtering, washing, and optionally drying, to obtain a Y-type molecular sieve comprising calcium and rare earth and having a normal lattice constant and reduced sodium oxide content;

(2) subjecting the above Y-type molecular sieve comprising calcium and rare earth and having a normal lattice constant and reduced sodium oxide content to roasting at a temperature of about 350-480° C. in an atmosphere of about 30-90 vol % of steam for about 4.5-7 hours, optionally drying, to obtain a Y-type molecular sieve with reduced lattice constant;

(3) contacting the Y-type molecular sieve with reduced lattice constant with gaseous silicon tetrachloride for reaction at a weight ratio of $SiCl_4$ to the Y-type molecular sieve with reduced lattice constant, on a dry basis, of about 0.1:1 to about 0.7:1, and a reaction temperature of about 200-650° C. for a reaction time of about 10 minutes to about 5 hours, washing and filtering, to obtain the modified Y-type molecular sieve.

C7. The method according to Item C6, wherein the Y-type molecular sieve comprising calcium and rare earth and having a normal lattice constant and reduced sodium oxide content obtained in step (1) has a lattice constant of about 2.465-2.472 nm and a sodium oxide content of no more than 8.8 wt %; the Y-type molecular sieve with reduced lattice constant obtained in the step (2) has a lattice constant of about 2.450-2.462 nm, and a water content of no more than about 1 wt %.

C8. The method according to Item C7, wherein in step (1), the Y-type molecular sieve comprising calcium and rare earth and having a normal lattice constant and reduced sodium oxide content has a calcium content of about 0.4-3.9 wt % calculated on the basis of CaO, a rare earth content of about 2-7 wt % calculated on the basis of $RE_2O_3$, and a sodium oxide content of about 4-8.8 wt %, for example about 5.5-8.5 wt %, and a lattice constant of about 2.465-2.472 nm.

C9. The method according to Item C6, wherein the step (1) of contacting a NaY molecular sieve with a solution of a soluble calcium salt and a soluble rare earth salt for ion exchange reaction is carried out by mixing a NaY molecular sieve, a soluble calcium salt, a soluble rare earth salt and water at a weight ratio of the NaY molecular sieve:the soluble calcium salt:the soluble rare earth salt:$H_2O$ of about 1:0.009-0.28:0.005-0.09:5-15, and stirring.

C10. The method according to Item C6 or C9, wherein the step (1) of contacting a NaY molecular sieve with a solution of a soluble calcium salt and a soluble rare earth salt for ion exchange reaction comprises: mixing a NaY molecular sieve with water, adding a soluble calcium salt and/or a solution of a soluble calcium salt and a soluble rare earth salt and/or a solution of a soluble rare earth salt under stirring to conduct an ion exchange reaction, filtering and washing; the conditions for the ion exchange reaction include: an exchange temperature of about 15-95° C. and an exchange time of about 30-120 minutes; wherein the solution of soluble calcium salt and the solution of soluble rare earth salt are aqueous solutions of the soluble calcium salt and the soluble rare earth salt; the soluble calcium salt is for example calcium chloride and/or calcium nitrate, and the soluble rare earth salt is for example a rare earth chloride and/or a rare earth nitrate.

C11. The method according to Item C6, wherein in step (2), the roasting temperature is about 380-460° C., the roasting atmosphere is an atmosphere of about 40-80 vol % steam, and the roasting time is about 5-6 hours.

C12. The method according to Item C6, wherein the washing of step (3) is carried out by washing with water under conditions including: a ratio of molecular sieve:$H_2O$ of about 1: 6-15, a pH of about 2.5-5.0, and a washing temperature of about 30-60° C.

C13. A catalytic cracking method, comprising the step of contacting a heavy oil with a catalytic cracking catalyst under FCC conditions, wherein the catalytic cracking catalyst is a catalytic cracking catalyst according to any one of Items C1-05; and the FCC conditions include, for example: a reaction temperature of about 480-530° C., a reaction time of 1-10 seconds, a catalyst-to-oil ratio of 3-20:1 by weight.

EXAMPLES

The present application will be further illustrated by the following examples, without however limiting the present application.

Feedstocks: In the following examples and comparative examples, NaY molecular sieves are supplied by Qilu Branch of Sinopec Catalyst Co., Ltd., of which the sodium content is 13.5 wt % calculated on the basis of sodium oxide, the framework silica-alumina ratio ($SiO_2/Al_2O_3$ molar ratio) is 4.6, the lattice constant is 2.470 nm, and the relative crystallinity is 90%; calcium chloride and calcium nitrate are chemically pure reagents produced by Sinopharm Chemical Reagent Co., Ltd. (Hushi); rare earth chloride and rare earth nitrate are chemically pure reagents produced by Beijing Chemical Works; pseudo-boehmite is an industrial product produced by Shandong Aluminum Plant with a solid content of 61 wt %; kaolin is a specialized kaolin for cracking catalysts produced by China Kaolin Clay Co., Ltd. of Suzhou with a solid content of 76 wt %; aluminum sol is supplied by Qilu Branch of Sinopec Catalyst Co., Ltd. having an alumina content of 21 wt %.

Unless otherwise stated, the reagents used in each of the comparative examples and examples were chemically pure reagents.

Analytical method: In each of the comparative examples and examples, the element content of the molecular sieve was determined by X-ray fluorescence spectrometry; the lattice constant and relative crystallinity of the molecular sieve were determined by X-ray powder diffraction (XRD) according to the RIPP 145-90, RIPP 146-90 standard method (see "Petrochemical Analysis Methods (RIPP Test Methods)", edited by Cuiding YANG et al., Science Press, September 1990, First Edition, pp. 412-415), the framework silica-alumina ratio of the molecular sieve was calculated according to the following equation:

$$SiO_2/Al_2O_3 = (2.5858 - a_0) \times 2/(a_0 - 2.4191)$$

wherein $a_0$ refers to the lattice constant, of which the unit is nm.

The total silica-alumina ratio of the molecular sieve was calculated based on the content of Si and Al elements determined by X-ray fluorescence spectrometry. The proportion of framework Al content to the total Al content was calculated based on the framework silica-alumina ratio determined by XRD and the total silica-alumina ratio determined by XRF, and then the proportion of non-framework Al content to the total Al content was calculated. The lattice collapse temperature was determined by differential thermal analysis (DTA).

In each of the comparative examples and examples, the acid center type of the molecular sieve and the acid content thereof were determined by pyridine adsorption infrared spectroscopy. The instrument was IFS113V type FT-IR (Fourier transform infrared) spectrometer of Bruker Company, USA. The method for determining the acid content by pyridine adsorption infrared spectroscopy at 200° C. was as follows: a self-supported sample tablet was placed in an in-situ cell of an infrared spectrometer and sealed; the sample was heated to a temperature of 400° C., vacuumed to $10^{-3}$ Pa, and maintained at the temperature for 2 h to remove the gas molecules adsorbed by the sample; the sample was cooled to room temperature, a pyridine vapor at a pressure of 2.67 Pa was introduced, and the sample was maintained under such conditions for 30 min to achieve an adsorption equilibrium; then the sample was heated to a temperature of 200° C., and vacuumed to $10^{-3}$ Pa for desorption for 30 min; after that, the sample was cooled to room temperature and subjected to spectrographic analysis at a scanning wave number range of 1400 $cm^{-1}$ to 1700 $cm^{-1}$, and the pyridine adsorption infrared spectrum of the sample desorbed at 200° C. was obtained. The relative amount of the total Brönsted acid center (B acid center) and the Lewis acid center (L acid center) in the molecular sieve was obtained based on the intensity of the characteristic adsorption peaks at 1540 $cm^{-1}$ and 1450 $cm^{-1}$ in the pyridine adsorption infrared spectrum.

In each of the comparative examples and examples, the pore volume of secondary pores was determined as follows: according to the RIPP 151-90 standard method (see "Petrochemical Analysis Methods (RIPP Test Methods)", Cuiding YANG et al., Science Press, September 1990, First Edition, pp. 424-426), the total pore volume of the molecular sieve was determined based on the adsorption isotherm, and then the micropore volume of the molecular sieve was determined based on the adsorption isotherm according to the T-plot method, and the pore volume of secondary pores was obtained by subtracting the micropore volume from the total pore volume.

In each of the comparative examples and examples, the O1s electron binding energy of the molecular sieve was determined as follows: XPS test was performed on the ESCALab 250 X-ray photoelectron spectrometer of Thermo Fisher. The excitation source was monochromated Al Kα X-ray with an energy of 1486.6 eV and a power of 150 W. The penetration energy for narrow scans was 30 eV. The base vacuum at the time of analysis was about $6.5 \times 10^{-10}$ mbar. The binding energy was calibrated in accordance with the C1s peak (284.8 eV) of alkyl carbon or contaminated carbon. The processing software was Avantage 5.952 originally installed in the instrument. The binding energy value was determined based on the XPS data obtained.

Example 1

2000 g of NaY molecular sieve (on a dry basis) was added into 20 L of decationized water and mixed uniformly under stirring, 345 ml of Ca(NO$_3$)$_2$ solution (with a concentration of 248 g/L calculated on the basis of CaO) was added, 300 ml of RE(NO$_3$)$_3$ solution (with a concentration of 319 g/L calculated on the basis of RE$_2$O$_3$) was then added, and the mixture was stirred, heated to a temperature of 90-95° C. and kept for 1 hour. Then, the mixture was filtered and washed, and the filter cake was dried at 120° C., to obtain a Y-type molecular sieve having a lattice constant of 2.471 nm, a sodium content of 6.6 wt % calculated on the basis of sodium oxide, a calcium content of 4.9 wt % calculated on the basis of CaO, and a rare earth content of 4.4 wt % calculated on the basis of RE$_2$O$_3$. Then, the resultant was roasted at 390° C. in an atmosphere comprising 50 vol % of steam and 50 vol % of air for 6 hours to obtain a Y-type molecular sieve having a lattice constant of 2.455 nm, and then dried to arrive at a water content of less than 1 wt %. After that, a gaseous SiCl$_4$ vaporized by heating was introduced at a weight ratio of SiCl$_4$:Y-type molecular sieve (on a dry basis) of 0.5:1, reacted at 400° C. for 2 hours, then washed with 20 L of decationized water, and filtered to obtain a modified Y-type molecular sieve of the present application, designated as SZ1, of which the physicochemical properties are shown in Table 1.

After SZ1 was aged in a bare state at 800° C. under atmospheric pressure in a 100% steam atmosphere for 17 hours, the relative crystallinity of the molecular sieve SZ1 before and after aging was analyzed by XRD, and the relative crystallinity retention after aging was calculated. The results are shown in Table 2, in which:

$$\text{Relative crystallinity retention} = \frac{\text{Relative crystallinity of aged sample}}{\text{Relative crystallinity of fresh sample}} \times 100\%$$

Example 2

2000 g of NaY molecular sieve (on a dry basis) was added into 25 L of decationized water and mixed uniformly under stirring, 368 ml of CaCl$_2$ solution (with a concentration of 248 g/L calculated on the basis of CaO) was added, 400 ml of RECl$_3$ solution (with a concentration of 319 g/L calculated on the basis of RE$_2$O$_3$) was then added, and the mixture was stirred, heated to a temperature of 90-95° C. and kept for 1 hour. Then, the mixture was filtered and washed, and the filter cake was dried at 120° C., to obtain a Y-type molecular sieve having a lattice constant of 2.471 nm, a sodium content of 5.2 wt % calculated on the basis of sodium oxide, a calcium content of 8.7 wt % calculated on the basis of CaO, and a rare earth content of 5.7 wt % calculated on the basis of RE$_2$O$_3$. Then, the resultant was roasted at a temperature of 450° C. in an atmosphere of 80% steam for 5.5 hours to obtain a Y-type molecular sieve having a lattice constant of 2.461 nm, and then dried to arrive at a water content of less than 1 wt %. After that, a gaseous SiCl$_4$ vaporized by heating was introduced at a weight ratio of SiCl$_4$:Y-type molecular sieve of 0.6:1, reacted at 480° C. for 1.5 hours, then washed with 20 L of decationized water, and filtered to obtain a modified Y-type molecular sieve, designated as SZ2, of which the physicochemical properties are shown in Table 1.

After SZ2 was aged in a bare state at 800° C. under atmospheric pressure in a 100% steam atmosphere (i.e. aged in an atmosphere of 100% steam for 17 hours), the crystallinity of the molecular sieve SZ2 before and after aging was analyzed by XRD, and the relative crystallinity retention after aging was calculated. The results are shown in Table 2.

Example 3

2000 g of NaY molecular sieve (on a dry basis) was added into 22 L of decationized water and mixed uniformly under stirring, 214 ml of CaCl$_2$ solution (with a concentration of 248 g/L calculated on the basis of CaO) was added, 285 ml of RECl$_3$ solution (with a concentration of 319 g/L calculated on the basis of RE$_2$O$_3$) was then added, and the mixture was stirred, heated to a temperature of 90-95° C., and kept for 1 hour under stirring. Then, the mixture was filtered and washed, and the filter cake was dried at 120° C., to obtain a Y-type molecular sieve having a lattice constant of 2.471 nm, a sodium content of 7.2 wt % calculated on the basis of sodium oxide, a calcium content of 3.8 wt % calculated on the basis of CaO, and a rare earth content of 4.7 wt % calculated on the basis of RE$_2$O$_3$. Then, the resultant was roasted at 470° C. in an atmosphere of 70 vol % of steam for 5 hours to obtain a Y-type molecular sieve having a lattice constant of 2.458 nm, and then dried to arrive at a water content of less than 1 wt %. After that, a gaseous SiCl$_4$ vaporized by heating was introduced at a weight ratio of SiCl$_4$:Y-type molecular sieve of 0.4:1, reacted at 500° C. for 1 hours, then washed with 20 L of decationized water, and filtered to obtain a modified Y-type molecular sieve, designated as SZ3, of which the physicochemical properties are shown in Table 1.

After SZ3 was aged in a bare state at 800° C. under atmospheric pressure in a 100% steam atmosphere, the crystallinity of the molecular sieve SZ3 before and after aging was analyzed by XRD, and the relative crystallinity retention after aging was calculated. The results are shown in Table 2.

Comparative Example 1

2000 g of NaY molecular sieve (on a dry basis) was added into 20 L of decationized water, mixed uniformly under stirring, 1000 g of (NH$_4$)$_2$SO$_4$ was added, and the mixture was stirred, heated to a temperature of 90-95° C., and kept for 1 hour. Then, after filtering and washing, the filter cake was dried at 120° C., and then subjected to a hydrothermal treatment by roasting at 650° C. in a 100% steam atmosphere for 5 hours. Then, the resultant was added into 20 L of decationized water, uniformly mixed under stirring, 1000 g of (NH$_4$)$_2$SO$_4$ was added, and the mixture was stirred, heated to a temperature of 90-95° C., and kept for 1 hour. Then, after filtering and washing, the filter cake was dried at 120° C., and then subjected to a second hydrothermal treatment by roasting at 650° C. in a 100% steam atmosphere for 5 hours, to obtain a hydrothermally ultra-stabilized Y-type molecular sieve free of calcium and rare earth that has undergone two stages of ion-exchange and two stages of hydrothermal ultra-stabilization, designated as DZ1, of which the physicochemical properties are shown in Table 1.

After DZ1 was aged in a bare state at 800° C. under atmospheric pressure in a 100% steam atmosphere, the crystallinity of the molecular sieve DZ1 before and after aging was analyzed by XRD, and the relative crystallinity retention after aging was calculated. The results are shown in Table 2.

Comparative Example 2

2000 g of NaY molecular sieve (on a dry basis) was added into 20 L of decationized water, mixed uniformly under stirring, 1000 g of $(NH_4)_2SO_4$ was added, and the mixture was stirred, heated to a temperature of 90-95° C., and kept for 1 hour. Then, after filtering and washing, the filter cake was dried at 120° C., and then subjected to a hydrothermal treatment by roasting at 650° C. in a 100% steam atmosphere for 5 hours. Then, the resultant was added into 20 L of decationized water, uniformly mixed under stirring, 203 ml of $Ca(NO_3)_2$ solution (with a concentration of 248 g/L calculated on the basis of CaO) was added, 100 ml of $RE(NO_3)_3$ solution (with a concentration of 319 g/L calculated on the basis of $RE_2O_3$) and 900 g $(NH_4)_2SO_4$ were then added, and the mixture was stirred, heated to a temperature of 90-95° C., and kept for 1 hour. Then, after filtering and washing, the filter cake was dried at 120° C., and then subjected to a second hydrothermal treatment by roasting at 650° C. in a 100% steam atmosphere for 5 hours, to obtain a hydrothermally ultra-stabilized rare earth-containing Y-type molecular sieve that has undergone two stages of ion-exchange and two stages of hydrothermal ultra-stabilization, designated as DZ2, of which the physicochemical properties are shown in Table 1.

After DZ2 was aged in a bare state at 800° C. under atmospheric pressure in a 100% steam atmosphere, the crystallinity of the molecular sieve DZ2 before and after aging was analyzed by XRD, and the relative crystallinity retention after aging was calculated. The results are shown in Table 2.

Comparative Example 3

2000 g of NaY molecular sieve (on a dry basis) was added into 20 L of decationized water and mixed uniformly under stirring, 243 ml of $Ca(NO_3)_2$ solution (with a concentration of 248 g/L calculated on the basis of CaO) was added, 325 ml of $RE(NO_3)_3$ solution (319 g/L) was then added, and the mixture was stirred, heated to a temperature of 90-95° C. and kept for 1 hour. Then, the mixture was filtered, washed and dried to arrive at a water content of less than 1 wt %. Then, the resultant was subjected to a gas phase ultra-stabilization by introducing gaseous $SiCl_4$ vaporized by heating at a weight ratio of $SiCl_4$:Y-type molecular sieve of 0.4:1, and reacting at 580° C. for 1.5 hours. The resultant was washed with 20 L of decationized water, and filtered to obtain a gas phase ultra-stabilized high-silica Y-type molecular sieve, designated as DZ3, of which the physicochemical properties are shown in Table 1.

After DZ3 was aged in a bare state at 800° C. under atmospheric pressure in a 100% steam atmosphere, the crystallinity of the molecular sieve DZ3 before and after aging was analyzed by XRD, and the relative crystallinity retention after aging was calculated. The results are shown in Table 2.

TABLE 1

Properties of the molecular sieves obtained in the Examples 1-3 and Comparative Examples 1-3

| | Ex. 1 | Ex. 2 | Ex. 3 | Comp. Ex. 1 | Comp. Ex. 2 | Comp. Ex. 3 |
|---|---|---|---|---|---|---|
| Sample Name | SZ1 | SZ2 | SZ3 | DZ1 | DZ2 | DZ3 |
| CaO content/wt % | 2.3 | 3 | 0.9 | 0 | 0.6 | 0.7 |
| $RE_2O_3$ content/wt % | 2.8 | 4.3 | 3.2 | 0 | 1.4 | 3.1 |
| $Na_2O$ content/wt % | 0.44 | 0.45 | 0.37 | 1.3 | 1.52 | 0.86 |
| Total $SiO_2/Al_2O_3$ molar ratio | 9.27 | 7.03 | 8.32 | 4.95 | 4.49 | 11.78 |
| Framework $SiO_2/Al_2O_3$ molar ratio | 11.39 | 8.13 | 9.95 | 10.39 | 7.29 | 12.56 |
| Framework aluminum/total aluminum × 100 | 81.4 | 86.45 | 83.66 | 47.59 | 61.63 | 93.78 |
| Non-framework aluminum/total aluminum × 100 | 18.6 | 13.55 | 16.34 | 52.41 | 38.37 | 6.22 |
| Lattice constant/nm | 2.444 | 2.452 | 2.447 | 2.446 | 2.455 | 2.442 |
| Relative crystallinity/% | 61.9 | 60.8 | 64.2 | 60.1 | 56.8 | 56.5 |
| Structure collapse temperature/° C. | 1059 | 1053 | 1062 | 1038 | 1022 | 1043 |
| Specific surface area/(m²/g) | 638 | 657 | 631 | 615 | 602 | 645 |
| Total pore volume/(ml/g) | 0.355 | 0.379 | 0.364 | 0.349 | 0.328 | 0.337 |
| Micropore volume/(ml/g) | 0.284 | 0.312 | 0.294 | 0.255 | 0.252 | 0.323 |

TABLE 1-continued

Properties of the molecular sieves obtained in the Examples 1-3 and Comparative Examples 1-3

| | Ex. 1 | Ex. 2 | Ex. 3 | Comp. Ex. 1 | Comp. Ex. 2 | Comp. Ex. 3 |
|---|---|---|---|---|---|---|
| Pore volume of secondary pores/(ml/g) | 0.071 | 0.067 | 0.07 | 0.094 | 0.076 | 0.014 |
| Proportion of pore volume of secondary pores (2.0-100 nm) to the total pore volume/% | 20.00 | 17.68 | 19.23 | 26.93 | 23.17 | 4.15 |
| B acid/L acid (total acid content ratio) | 2.49 | 3.48 | 3.12 | 0.75 | 2.23 | 3.74 |
| O1s Electron binding energy/eV | 532.62 | 532.58 | 532.64 | 532.76 | 532.85 | 532.87 |

It can be seen from Table 1, the modified Y-type molecular sieve of the present application has the following advantages: a low sodium content calculated on the basis of sodium oxide, a relatively higher silica-alumina ratio and a relatively lower non-framework aluminum content, a relatively higher proportion of the pore volume of secondary pores having a pore size of 2.0-100 nm to the total pore volume, a relatively higher B acid/L acid ratio (the ratio of total B acid content to total L acid content), a relatively higher crystallinity determined when the molecular sieve has a relatively smaller lattice constant and a certain calcium and rare earth content, and a higher thermal stability.

TABLE 2

Hydrothermal stability of molecular sieves obtained in the Examples 1-3 and Comparative Examples 1-3

| Example No. | Sample Name | Relative crystallinity of fresh molecular sieve sample (%) | Relative crystallinity of aged molecular sieve sample (%) (800° C./aged for 17 hours) | Relative crystallinity retention/% |
|---|---|---|---|---|
| Example 1 | SZ1 | 62.3 | 26.82 | 43.05 |
| Example 2 | SZ2 | 59.9 | 23.82 | 39.77 |
| Example 3 | SZ3 | 64.1 | 25.42 | 39.66 |
| Comparative Example 1 | DZ1 | 60.1 | 4.3 | 7.15 |
| Comparative Example 2 | DZ2 | 56.3 | 5.8 | 10.30 |
| Comparative Example 3 | DZ3 | 57.2 | 18.1 | 31.64 |

It can be seen from Table 2 that the modified Y-type molecular sieve of the present application shows a relatively higher relative crystallinity retention after being aged in a bare state under severe conditions at 800° C. for 17 hours, indicating that the modified Y-type molecular sieve of the present application has a high hydrothermal stability.

Examples 4-8

Examples 4-8 illustrate the catalytic cracking activity and stability of catalysts comprising the modified Y-type molecular sieve of the present application.

Catalysts, designated as SC1, SC2, SC3, SC4 and SC5, were prepared from the modified Y-type molecular sieves SZ1, SZ2 and SZ3 obtained in Examples 1-3. The catalysts were evaluated for micro-activity for light oils after aging at 800° C. in a 100% steam atmosphere for 4 or 17 hours, and the results are shown in Table 3.

The method for preparing the catalysts are described hereinbelow:

Catalyst SC1

714.5 g of an alumina sol having an alumina content of 21 wt % was added to 1565.5 g of decationized water, stirring was started, and 2763 g of kaolin having a solid content of 76 wt % was added and dispersed for 60 minutes. 2049 g of pseudo-boehmite having an alumina content of 61 wt % was added into 8146 g of decationized water, 210 ml of hydrochloric acid with a mass concentration of 36% was added under stirring, and the slurry of dispersed kaolin was added after 60 minutes of acidification. Then, 1500 g (on a dry basis) of ground SZ1 molecular sieve was added, uniformly mixed under stirring, then spray dried, washed, and dried to obtain a catalyst, designated as SC1. The resulted SC1 catalyst comprises, on a dry basis, 30 wt % of the modified Y-type molecular sieve, 42 wt % of kaolin, 25 wt % of pseudo-boehmite and 3 wt % of alumina sol.

Catalysts SC2 and SC3

Catalysts SC2 and SC3 were prepared in the same manner as described above for the catalyst SC1, by using the molecular sieves SZ2 and SZ3, respectively, in place of the molecular sieve SZ1. The resulted catalysts SC2 and SC3 both comprise, on a dry basis, 30 wt % of the modified Y-type molecular sieve, 42 wt % of kaolin, 25 wt % of pseudo-boehmite and 3 wt % of alumina sol.

Catalysts SC4 and SC5

Catalysts SC4 and SC5 were prepared in substantially the same manner as described above for the catalyst SC1 using the molecular sieve SZ2, wherein the amount of each staring material was adjusted appropriately, so that the resulted catalyst SC4 comprises, on a dry basis, 25 wt % of molecular sieve SZ2, 47 wt % of kaolin, 24 wt % of pseudo-boehmite, and 4 wt % of alumina sol; and the resulted catalyst SC5 comprises 40 wt % of molecular sieve SZ2, 30 wt % of kaolin, 20 wt % of pseudo-boehmite and 10 wt % of alumina sol.

Evaluation of Micro-Activity for Light Oils:

The micro-activity for light oils of each catalyst sample was evaluated according to the standard method of RIPP 92-90 (see "Petrochemical Analysis Methods (RIPP Test Methods)", edited by Cuiding YANG et al., Science Press, September 1990, First Edition, pp. 263-268), in which the catalyst loading was 5.0 g, the reaction temperature was 460° C., and the feedstock oil was Dagang light diesel oil having a distillation range of 235-337° C. The composition of the product was analyzed by gas chromatography, and the micro-activity for light oils was calculated based on the composition of the product.

Micro-activity for light oils (MA)=(production of gasoline below 216° C.+gas production+coke production)/total amount of feed×100%.

Comparative Examples 4-6

Comparative Examples 4-6 illustrate the catalytic cracking activity and stability of catalysts comprising the ultra-stable Y-type molecular sieves obtained in Comparative Examples 1-3.

Catalysts DC1, DC2 and DC3 were prepared in accordance with the catalyst preparation method described in Examples 4-8 by using the ultra-stable Y-type molecular sieves DZ1, DZ2 and DZ3 obtained in Comparative Examples 1-3, respectively. The resulted catalysts DC1, DC2 and DC3 all comprise, on a dry basis, 30 wt % of the ultra-stable Y-type molecular sieve, 42 wt % of kaolin, 25 wt % of pseudo-boehmite and 3 wt % of alumina sol. Each catalyst was evaluated for micro-activity for light oils after aging at 800° C. in a 100% steam atmosphere for 4 or 17 hours in accordance with the evaluation method described in Examples 4-8, and the results are shown in Table 3.

TABLE 3

Results of Examples 4-8 and Comparative Examples 4-6

| Example No. | Sample Name | MA (initial) (800° C./4 h) | MA (equilibrium) (800° C./17 h) | MA (equilibrium)/ MA (initial) |
|---|---|---|---|---|
| Example 4 | SC1 | 80 | 68 | 85.00 |
| Example 5 | SC2 | 82 | 67 | 81.71 |
| Example 6 | SC3 | 80 | 67 | 83.75 |
| Example 7 | SC4 | 75 | 60 | 80.00 |
| Example 8 | SC5 | 85 | 73 | 85.88 |
| Comparative Example 4 | DC1 | 41 | 18 | 43.90 |
| Comparative Example 5 | DC2 | 50 | 28 | 56.00 |
| Comparative Example 6 | DC3 | 79 | 57 | 72.15 |

Examples 9-13

Examples 9-13 illustrate the catalytic cracking performance of the catalysts comprising the modified Y-type molecular sieve according to the present application.

The catalysts SC1, SC2, SC3, SC4 and SC5 were aged at 800° C. under atmospheric pressure in a 100% steam atmosphere, and their catalytic cracking performances were evaluated on a small fixed fluidized bed reactor (ACE). Cracking gas and product oils were collected separately and analyzed by gas chromatography. The catalyst loading was 9 g, the reaction temperature was 500° C., the weight hourly space velocity was 16 $h^{-1}$, and the catalyst-to-oil weight ratio was shown in Table 5. The properties of the feedstock oil used in the ACE test are shown in Table 4, and the results are shown in Table 5.

Content of branched hydrocarbon in gasoline (wt %)=content of isoparaffin in gasoline (wt %)+content of branched alkene in gasoline (wt %).

Content of branched C4-hydrocarbon (wt %)=isobutane content (wt %)+isobutene content (wt %).

Comparative Examples 7-9

Comparative Examples 7-9 illustrate the catalytic cracking performance of the catalysts comprising the ultra-stable Y-type molecular sieves obtained in Comparative Examples 1-3. The catalysts DC1, DC2 and DC3 were aged at 800° C. under atmospheric pressure in a 100% steam atmosphere, and their catalytic cracking performances were evaluated on a small fixed fluidized bed reactor (ACE) in accordance with the method described in Examples 9-13. The properties of the feedstock used in the ACE test are shown in Table 4, and the results are shown in Table 5.

TABLE 4

Properties of the feedstock oil used in the ACE evaluation

| Name | WuHan-mixed-III-2007 |
|---|---|
| Density (20° C.)/(g · $cm^{-3}$) | 0.9104 |
| Viscosity (80° C.)/($mm^2$/s) | 19.24 |
| Viscosity (100° C.)/($mm^2$/s) | 11.23 |
| Condensation point/° C. | 40 |
| Carbon residue/wt % | 3.11 |
| Saturated hydrocarbons/wt % | 62.3 |
| Aromatics/wt % | 22.7 |
| Resin/wt % | 14.4 |
| Asphalt/wt % | 0.6 |
| Element mass fraction/% | |
| C | 86.9 |
| H | 12.63 |
| S | 0.61 |
| N | 0.2 |
| Distillation range (D1160)/° C. | |
| Initial boiling point | 267 |
| 5% | 318 |
| 10% | 339 |
| 30% | 407 |
| 50% | 451 |
| 70% | 494 |
| 81.5% | 540 |

TABLE 5

Results of Examples 9-13 and Comparative Examples 7-9

| | Example No. | | | | | | | |
|---|---|---|---|---|---|---|---|---|
| | Ex. 9 | Ex. 10 | Ex. 11 | Ex. 12 | Ex. 13 | Comp. Ex. 7 | Comp. Ex. 8 | Comp. Ex. 9 |
| Sample Name | SC1 | SC2 | SC3 | SC4 | SC5 | DC1 | DC2 | DC3 |
| Molecular sieve used | SZ1 | SZ2 | SZ3 | SZ2 | SZ2 | DZ1 | DZ2 | DZ3 |
| Catalyst-to-oil ratio | 5 | 5 | 5 | 5 | 5 | 9 | 8 | 5 |
| Product distribution/wt % | | | | | | | | |
| Dry gas | 1.26 | 1.16 | 1.32 | 1.1 | 1.44 | 1.55 | 1.48 | 1.41 |
| Liquefied gas | 16.46 | 16.35 | 16.83 | 15.98 | 17.82 | 16.86 | 15.35 | 15.79 |
| Coke | 4.62 | 4.72 | 4.41 | 4.32 | 4.84 | 8.33 | 7.54 | 6.41 |
| Gasoline | 52.54 | 53.68 | 52.05 | 51.69 | 53.26 | 38.55 | 44.08 | 50.86 |
| Diesel oil | 17.06 | 17.53 | 17.21 | 18.46 | 16.63 | 20.17 | 19.45 | 17.23 |
| Heavy oil | 8.06 | 6.56 | 8.18 | 8.45 | 6.01 | 14.54 | 12.1 | 8.3 |
| Total | 100 | 100 | 100 | 100 | 100 | 100 | 100 | 100 |
| Conversion/wt % | 74.88 | 75.91 | 74.61 | 73.09 | 77.36 | 65.29 | 68.45 | 74.47 |
| Coke selectivity/wt % | 6.17 | 6.22 | 5.91 | 5.91 | 6.26 | 12.76 | 11.02 | 8.61 |
| Light oil yield/wt % | 69.6 | 71.21 | 69.26 | 70.15 | 69.89 | 58.72 | 63.53 | 68.09 |
| Total liquid yield/wt % | 86.06 | 87.56 | 86.09 | 86.13 | 87.71 | 75.58 | 78.88 | 83.88 |
| Content of branched hydrocarbon in gasoline/wt % | 38.92 | 39.05 | 38.94 | 38.43 | 40.85 | 36.70 | 36.78 | 36.82 |
| Branched C4-hydrocarbon/wt % | 6.95 | 7.67 | 7.21 | 7.43 | 8.07 | 5.02 | 5.56 | 5.58 |

From the results listed in Tables 3 and 5, it can be seen that the catalytic cracking catalyst prepared by using the molecular sieve of the present application as an active component has a very high hydrothermal stability, and, when used in catalytic cracking of heavy oils, shows a higher heavy oil conversion activity, a significantly lower coke selectivity, a significantly improved yield of total liquid, light oil, and gasoline, and a significantly increased production of branched C4-hydrocarbons, and the content of branched hydrocarbon in gasoline is also significantly increased.

In the above description, the concept of the present application has been described with reference to the embodiments. However, it will be understood by those skilled in the art that various modifications and changes can be made without departing from the scope of the present invention defined in the appended claims. Accordingly, the description and drawings should be regarded as illustrative rather than limiting, and all such modifications and changes are covered by the present invention.

It is to be understood that some of the features described separately in a plurality of embodiments for the sake of clarity may also be provided as a combination in a single embodiment. Conversely, a plurality of different features that are described in a single embodiment for the sake of brevity may also be provided separately or in any sub-combination in different embodiments.

The invention claimed is:

1. A modified Y-type molecular sieve, having a calcium content of 0.3-4 wt %, calculated on the basis of calcium oxide, a rare earth content of 2-7 wt %, calculated on the basis of rare earth oxide, and a sodium content of no more than 0.5 wt %, calculated on the basis of sodium oxide, on a dry basis and based on the weight of said modified Y-type molecular sieve,
wherein the modified Y-type molecular sieve has a total pore volume of 0.33-0.39 ml/g, a proportion of the pore volume of secondary pores having a pore size of 2-100 nm to the total pore volume of 10-25%, a lattice constant of 2.440-2.455 nm, a proportion of non-framework aluminum content to the total aluminum content of no more than 20%, a lattice collapse temperature of not lower than 1050° C., and a ratio of B acid to L acid in the total acid content of no less than 2.30, as determined by pyridine adsorption infrared spectroscopy at 200° C.

2. The modified Y-type molecular sieve according to claim 1, wherein the modified Y-type molecular sieve has a proportion of the pore volume of secondary pores having a pore size of 2-100 nm to the total pore volume of 15-21%.

3. The modified Y-type molecular sieve according to claim 2, wherein the modified Y-type molecular sieve has a proportion of non-framework aluminum content to the total aluminum content of 13-19%, and a framework silica-alumina ratio, calculated as $SiO_2/Al_2O_3$ molar ratio, of 7.3-14.

4. The modified Y-type molecular sieve according to claim 1, wherein the modified Y-type molecular sieve has a lattice collapse temperature of 1050-1080° C.

5. The modified Y-type molecular sieve according to claim 4, wherein the modified Y-type molecular sieve has a ratio of B acid to L acid in the total acid content of 2.3-5.0, as determined by pyridine adsorption infrared spectroscopy at 200° C.

6. The modified Y-type molecular sieve according to claim 1, wherein the modified Y-type molecular sieve has a relative crystalline retention of 35% or more, after aging at 800° C. under atmospheric pressure in a 100% steam atmosphere for 17 hours.

7. The modified Y-type molecular sieve according to claim 6, wherein the modified Y-type molecular sieve has a relative crystallinity of 58-68%.

8. The modified Y-type molecular sieve according to claim 1, wherein the modified Y-type molecular sieve has a calcium content of 0.5-3.5 wt %, calculated on the basis of calcium oxide, a rare earth content of 2.5-6.5 wt %, calculated on the basis of rare earth oxide, a sodium content of 0.2-0.5 wt %, calculated on the basis of sodium oxide, a lattice constant of 2.442-2.452 nm, and a framework silica-alumina ratio of 8-12.6 calculated as $SiO_2/Al_2O_3$ molar ratio.

9. The modified Y-type molecular sieve according to claim 1, wherein the modified Y-type molecular sieve has an O1s electron binding energy of no greater than 532.70 eV.

10. A method for preparing a modified Y-type molecular sieve according to claim 1, comprising the steps of:
  (1) contacting a NaY molecular sieve with a solution of a soluble calcium salt and a soluble rare earth salt for ion exchange reaction to obtain a Y-type molecular sieve comprising calcium and rare earth with reduced sodium content;
  (2) subjecting the Y-type molecular sieve obtained in the step (1) to roasting at a temperature of 350-480° C. in an atmosphere of 30-90 vol % of steam for 4.5-7 hours, and optionally drying, to obtain a Y-type molecular sieve with reduced lattice constant; and
  (3) contacting the Y-type molecular sieve with reduced lattice constant with gaseous silicon tetrachloride for reaction at a weight ratio of $SiCl_4$ to the Y-type molecular sieve with reduced lattice constant, on a dry basis, of 0.1:1 to 0.7:1, at a reaction temperature of 200-650° C. for a reaction time of 10 minutes to 5 hours to obtain the modified Y-type molecular sieve.

11. The method according to claim 10, wherein the Y-type molecular sieve obtained in step (1) has a lattice constant of 2.465-2.472 nm, a sodium content of no more than 8.8 wt %, calculated on the basis of sodium oxide.

12. The method according to claim 11, wherein the Y-type molecular sieve obtained in step (1) has a calcium content of 0.3-10 wt %, calculated on the basis of calcium oxide, a rare earth content of 2-8 wt %, calculated on the basis of rare earth oxide, a sodium content of 4-8.8 wt %, calculated on the basis of sodium oxide, and a lattice constant of 2.465-2.472 nm.

13. The method according to claim 10, wherein in step (1), the NaY molecular sieve, the soluble calcium salt, the soluble rare earth salt and water are mixed at a weight ratio of the NaY molecular sieve : the soluble calcium salt : the soluble rare earth salt: $H_2O$ of 1:0.009-0.28:0.005-0.09:5-15 for ion exchange.

14. The method according to claim 10, wherein the step (1) further comprises mixing the NaY molecular sieve with water, and adding thereto a soluble calcium salt, a solution of a soluble calcium salt, a soluble rare earth salt a solution of a soluble rare earth salt under stirring to conduct an ion exchange reaction
  at an exchange temperature of 15-95° C. and an exchange time of 30-120 minutes.

15. The method according to claim 14, wherein each of the solution of the soluble calcium salt and the solution of the soluble rare earth salt is an aqueous solution, and the soluble calcium salt is calcium chloride, calcium nitrate, or a combination thereof, and the soluble rare earth salt is a rare earth chloride, a rare earth nitrate, or a combination thereof.

16. The method according to claim 10, wherein in step (2), the roasting temperature is 380-460° C., the roasting atmosphere is an atmosphere of 40-80 vol % steam, and the roasting time is 5-6 hours.

17. The method according to claim 16, wherein the Y-type molecular sieve with reduced lattice constant obtained in step (2) has a lattice constant of 2.450-2.462 nm and a water content of no more than 1 wt %.

18. The method according to claim 10, wherein the step (3) further comprises washing the modified Y-type molecular sieve with water at a ratio of molecular sieve : $H_2O$ of 1:5-20, a pH of 2.5-5.0, and a washing temperature of 30-60° C.

19. A catalytic cracking catalyst, comprising 10-50 wt %, on a dry basis, of the modified Y-type molecular sieve according to claim 1, 10-40 wt % of an alumina binder calculated on the basis of alumina, and 10-80 wt %, on a dry basis, of a clay, based on the weight of the catalytic cracking catalyst.

20. A method for catalytic cracking of a hydrocarbon oil, comprising contacting the hydrocarbon oil with a catalytic cracking catalyst comprising the modified Y-type molecular sieve according to claim 1.

\* \* \* \* \*